Jan. 5, 1954 G. MOLINA 2,664,812
MOLD FOR FRYING TACOS WRAPPERS
Filed May 10, 1951
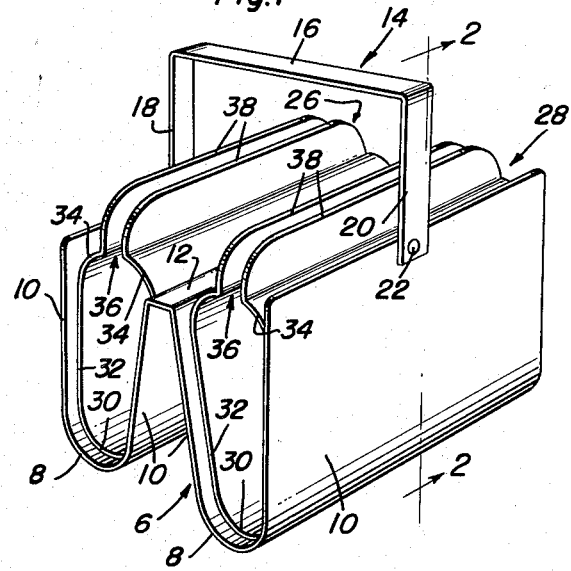
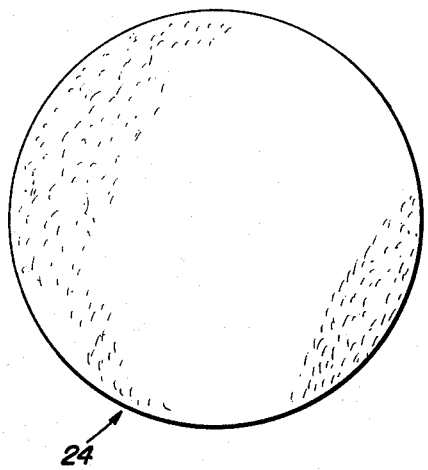
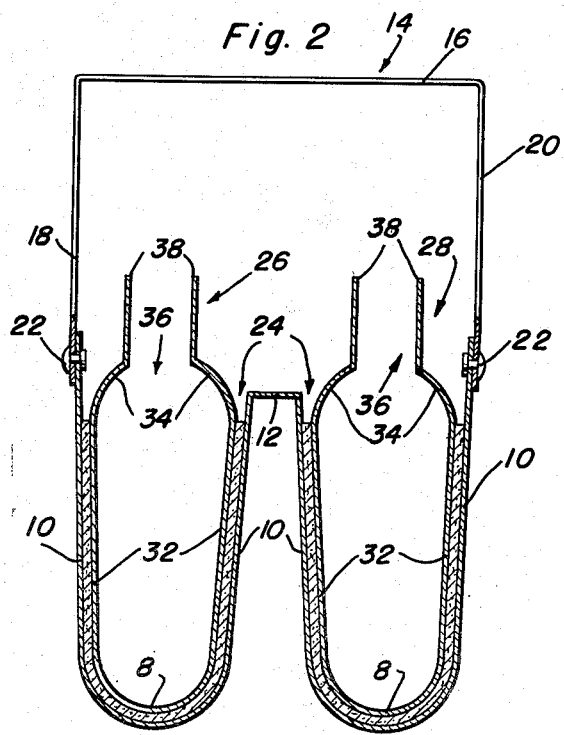
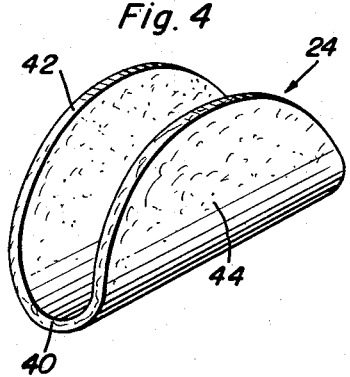
Gilberto Molina
INVENTOR.

Patented Jan. 5, 1954

2,664,812

UNITED STATES PATENT OFFICE 2,664,812

MOLD FOR FRYING TACOS WRAPPERS

Gilberto Molina, Tucson, Ariz.

Application May 10, 1951, Serial No. 225,504

2 Claims. (Cl. 99—426)

The present invention relates to certain new and useful improvements in portable sectional molds and has more particular reference to a simple and practical mold construction which is expressly adapted for shaping and frying an edible wrapper which is then used in making a Mexican-style tacos.

By way of preliminary explanation, a tacos is a Mexican delicacy in which a crisply fried tortilla is used as a confining and shaping wrapper. A tortilla is, as is generally well known, a flat circular cake usually made of coarse corn meal and baked on a hot sheet or iron or slab of stone; the universal substitute for bread in Mexico. The crisp tortilla, serving as a holder and wrapper is filled with a mixture of lettuce, onions, hot sauce and other ingredients according to the varied recipes of Mexicans. The difficulty encountered by most persons in turning out good tacos is that the relatively thin flat tortilla, after it is fried crisp is hard to handle in its transformation into the desired trough-shaped wrapper without cracking or breaking the latter. Only those who are expertly skilfull are able to prepare perfect tacos because the tortilla will unfold and return to its original flat circular form when it is dropped in hot grease or deep fat. Then, it will fry into a comparatively hard form and cannot be successfully fashioned into the desired wrapper.

There has long existed a recognized need for a handy kitchen-type mold to assist users in making up satisfactory tacos. Therefore, the object of the instant invention is to provide a handy and practical sectional and portable mold in which inner and outer companion molds serve to fashion the tortilla dough into the desired shape, the shape it must maintain after it has been fried to desired crispness in hot deep fat.

Another object of the invention is to provide a light weight basket-like mold construction of an economical type in which manufacturers, users and others will find their respective requirements and needs fully met, contained and effectually available.

Briefly summarized, the improved construction is characterized by a basket-like portable unit embodying open-ended channel-shaped outer molds which are U-shaped in cross-section and are disposed in parallelism, the same provided with a carrying handle which is preferably in the form of a bail. Situated removably in each outer mold is an inner mold. The latter is of hollow or tubular open-ended form with the upper longitudinal edge split or open and with upstanding flanges along the edges defining the opening, said flanges serving as finger grips and said inner mold being expansible and contractible and having inherent resilient properties whereby it takes a normally expanded shape or form.

Other objects and advantages will become more readily apparent from the following description and the accompanying sheet of illustrative drawings.

In the accompanying sheet of drawings wherein like numerals are employed to designate like parts throughout the same:

Figure 1 is a perspective view of the complete portable sectional mold constituting the subject matter of the instant invention;

Figure 2 is an enlarged section taken approximately on the plane of the vertical line 2—2 of Figure 1, looking in the direction of the arrows;

Figure 3 is a top plan view of a conventional tortilla which functions as the container and edible wrapper for the desired tacos;

Figure 4 is a perspective view of the fried molded tortilla or wrapper which is to be subsequently filled to make up the tacos (not shown).

The outer mold unit is denoted, generally, by the numeral 6 and is of cellular construction and is to include one or more cells or outer molds. The one shown comprises a pair of spaced parallel outer molds. Each mold is like a trough or channel and is U-shaped in cross-section and open at opposite ends as denoted at 8. Each mold embodies spaced parallel side walls 10—10. The two molds are joined in spaced parallel relationship by connecting web 12. The carrying bail straddles the open upper end of the outer mold and this is denoted by the numeral 14 and is of inverted U-shaped form and includes a bight portion 16 and lateral arms 18 and 20 fastened by rivets or the like 22 to the upper intermediate edge portions of the outermost walls of the outer mold. This handle is for carrying and dipping and removing the entire structure in an obvious manner. It is to be pointed out that the over-all mold construction is immersed or dipped into hot deep fat for purposes of frying the circular flat tortilla 24 to the desired degree of crispness. The inner molds, denoted by the numerals 26 and 28 are of duplicate construction and are fashioned to fit in the channels provided by the outer molds. Each inner mold is formed from suitable sheet material and the sheet is bent intermediate its ends as at 30 to provide side walls 32 whose upper ends are curved inwardly toward each other as at 34—34 to define an opening or slit 36. The free edge or end portions of the bent sheet are fashioned into spaced parallel flanges 38—38 which constitute handles or finger grips. The metal used is of a desired degree of resiliency and therefore the inner mold is not only readily insertable and removable but is expansible and contractible. The inherent properties of expansion tend to expand the mold to exert pressure against the components of the tortilla or wrapper 24. The manner in which the latter is placed and held is shown in Figure 2 and the finished product, when it is crisply fried, has a curvate central portion 40 and opposed segmental sides 42 and 44, whereby to provide a sort of a trough-like receiver and holder for the mixture or filling (not shown) which goes to make up the tacos.

It will be understood, of course, that the invention comprehends a single outer mold and single insertable expansible and contractible inner mold with handle means on both. In addition, it comprehends the plural arrangement shown, and as a matter of fact, where larger constructions are needed in restaurants, any number of sections may be embodied in the over-all construction.

It is plain that the invention has to do with a simple, economical, convenient and handy contrivance which will be of great usefulness to housewives and cooks in restaurants and similar places and will expedite the cooking, making and serving of highly desirable tacos.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice provided no departure is made from the invention as claimed.

Having described the invention, what is claimed as new is:

1. As a new article of manufacture a portable basket-like outer mold unit of light weight imperforate sheet material of a size to be lowered and immersed in a supply of hot deep fat, said unit embodying spaced parallel molds, each U-shaped in cross-section and wholly open at their respective ends, and an upstanding carrying and handling bail having arms fastened to the respective outer walls of said molds, and an inner mold fitted removably into each complemental outer mold, said inner mold being of springy imperforate sheet material, being an open ended tube of a length comensurate with the length of the complemental outer mold and having its upper portion longitudinally split to render it expansible and contractible and to provide upstanding spaced parallel flanges, said flanges constituting fingergrips and residing in planes above the open upper portions of the outer molds and beneath the bight portion of said carrying bail.

2. A tacos wrapper shaping and frying mold through the medium of which each tacos wrapper is bent into desired shape, a shape which is to be maintained after it has been fried to desired crispness, comprising an outer mold unit embodying a plurality of spaced molds adapted to receive and impart the desired shape to the tacos wrapper during the dipping and frying step, said molds being imperforate, U-shaped in cross-section, and open at their respective vertical ends, a substantially U-shaped handle having its bight portion straddling the upper open ends of said U-shaped molds and having its depending lateral arms fastened to the upper intermediate edge portions of the outermost walls of said unit, and an expansible and contractible inner mold for each of said outer molds, each inner mold being an open-ended tube having its upper end longitudinally split for expansion and contraction with the edges along said split having spaced parallel flanges accessibly projecting to planes above the open upper end portions of said outer molds and providing finger-grips, said finger-grips being situated beneath the bight portion of said handle where they are accessible while catching hold of said handle.

GILBERTO MOLINA.

References Cited in the file of this patent

UNITED STATES PATENTS

| Number | Name | Date |
|---|---|---|
| 612,803 | Epstein | Oct. 18, 1898 |
| 682,515 | Allard | Sept. 10, 1901 |
| 944,414 | De Bruin | Dec. 28, 1909 |
| 1,596,652 | Giovannetti | Aug. 17, 1926 |
| 2,080,171 | Fairbanks et al. | May 11, 1937 |
| 2,506,305 | Maldonado | May 2, 1950 |
| 2,545,897 | Pompa | Mar. 20, 1951 |
| 2,570,060 | Johnson | Oct. 2, 1951 |
| 2,570,374 | Pompa | Oct. 9, 1951 |

FOREIGN PATENTS

| Number | Country | Date |
|---|---|---|
| 46,364 | Denmark | Oct. 24, 1932 |